United States Patent
Kobayashi et al.

(10) Patent No.: US 11,085,394 B2
(45) Date of Patent: Aug. 10, 2021

(54) ENGINE

(71) Applicant: HONDA MOTOR CO., LTD., Tokyo (JP)

(72) Inventors: Tetsuya Kobayashi, Saitama (JP); Yasunori Matsubara, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/032,607

(22) Filed: Sep. 25, 2020

(65) Prior Publication Data

US 2021/0017933 A1 Jan. 21, 2021

Related U.S. Application Data

(63) Continuation-in-part of application No. PCT/JP2018/013898, filed on Mar. 30, 2018, which is a continuation-in-part of application No. PCT/JP2018/013888, filed on Mar. 30, 2018.

(51) Int. Cl.
*F02F 7/00* (2006.01)
*F02B 75/22* (2006.01)

(52) U.S. Cl.
CPC ............ *F02F 7/0053* (2013.01); *F02B 75/22* (2013.01)

(58) Field of Classification Search
CPC ............................... F02F 77/0053; F02B 75/22
USPC ..................................................... 123/195 C
See application file for complete search history.

(56) References Cited

U.S. PATENT DOCUMENTS

| 5,031,591 A | 7/1991 | Shinoda et al. |
| 5,447,127 A | 9/1995 | Lück et al. |
| 5,861,691 A * | 1/1999 | Soh .......................... H02K 5/10 |
| | | 310/89 |
| 2016/0281597 A1 | 9/2016 | Kase et al. |
| 2019/0186592 A1 * | 6/2019 | Broughton ............ F02B 63/042 |

FOREIGN PATENT DOCUMENTS

| JP | S45-019452 Y | 8/1970 |
| JP | S60-114113 A | 6/1985 |
| JP | S61-081523 A | 4/1986 |
| JP | S61187253 | * 12/1986 |

(Continued)

OTHER PUBLICATIONS

Jun. 26, 2018, International Search Report issued for related PCT application No. PCT/JP2018/013888.

(Continued)

*Primary Examiner* — Joseph J Dallo
*Assistant Examiner* — Yi-Kai Wang
(74) *Attorney, Agent, or Firm* — Paratus Law Group, PLLC

(57) ABSTRACT

An engine is provided with: an engine body; and a top cover that covers the engine body, wherein at least a pair of engaging claws are provided to lateral walls, on both sides, of the top cover so as to extend downward, and a pair of engaging holes with which the engaging claws engage are provided to the engine body side. Each of the engaging claws is provided with a plate section that is provided so as to extend downward, and a bulging section that is provided to the leading end of the plate section and that bulges inward from the plate section, and the bulging section engages with the bottom surface of an inner wall section of the corresponding engaging hole.

3 Claims, 10 Drawing Sheets

(56) References Cited

FOREIGN PATENT DOCUMENTS

| | | |
|---|---|---|
| JP | S62-142222 A | 9/1987 |
| JP | S63-092054 A | 6/1988 |
| JP | H02-090324 U | 7/1990 |
| JP | H02-112940 A | 9/1990 |
| JP | H02-137506 A | 11/1990 |
| JP | H07-132736 A | 5/1995 |
| JP | 2005-193731 A | 7/2005 |
| JP | 2006-220180 A | 8/2006 |
| JP | 2006220180 A * | 8/2006 |
| JP | 2016-183626 A | 10/2016 |

OTHER PUBLICATIONS

Jun. 26, 2018, International Search Opinion issued for related PCT application No. PCT/JP2018/013888.
May 29, 2018, International Search Report issued for related PCT application No. PCT/JP2018/013898.
May 29, 2018, International Search Opinion issued for related PCT application No. PCT/JP2018/013898.

* cited by examiner

ENGINE

CROSS REFERENCE TO RELATED APPLICATION

This application is a continuation in part of PCT International Patent Application Nos. PCT/JP2018/013888 filed on Mar. 30, 2018 and PCT/JP2018/013898 filed on Mar. 30, 2018, the contents of which are all hereby incorporated by reference in their entirety.

TECHNICAL FIELD

The present invention relates to an engine which can be mounted on a working machine such as a lawn mower or a high pressure washer.

BACKGROUND ART

There is known an engine including an engine body and a top cover which covers the engine body. For example, the engine described in JP H02-137506 U is mounted on a lawn mower and includes a vertical type engine body which rotates a blade (cutting blade) and a top cover which covers an upper side of the engine body.

SUMMARY OF INVENTION

However, since the top cover described in JP H02-137506 U is attached to an engine body via bolts and nuts, it takes a lot of time to attach and detach, and thus there is a risk that the maintainability of the engine will deteriorate. Therefore, it is possible to conceive that the top cover can be attached by engaging the top cover with the engine body side via an engaging claw. However, in the case of attachment by engagement, when an external force such as an object hitting the top cover is applied, the engagement of the engaging claw may be released by the external force and the top cover may come off.

One aspect of the invention is to provide an engine capable of preventing a top cover from being disengaged from an engine body by preventing an engagement claw from being disengaged by an unintended external force.

According to one aspect of the invention is an engine includes: an engine body; and a top cover covering the engine body. The top cover is provided with at least a pair of engaging claws extending downward on side walls on both sides. The engine body is provided with a pair of engaging hole portions with which the pair of engaging claws are engaged. Each engaging claw includes, a plate portion extending downward, and a bulging portion which is provided at a tip of the plate portion and bulges inward from the plate portion. The bulging portion engages with a bottom surface of an inner wall portion of the engaging hole portion.

DESCRIPTION OF EMBODIMENT

Figure 1:
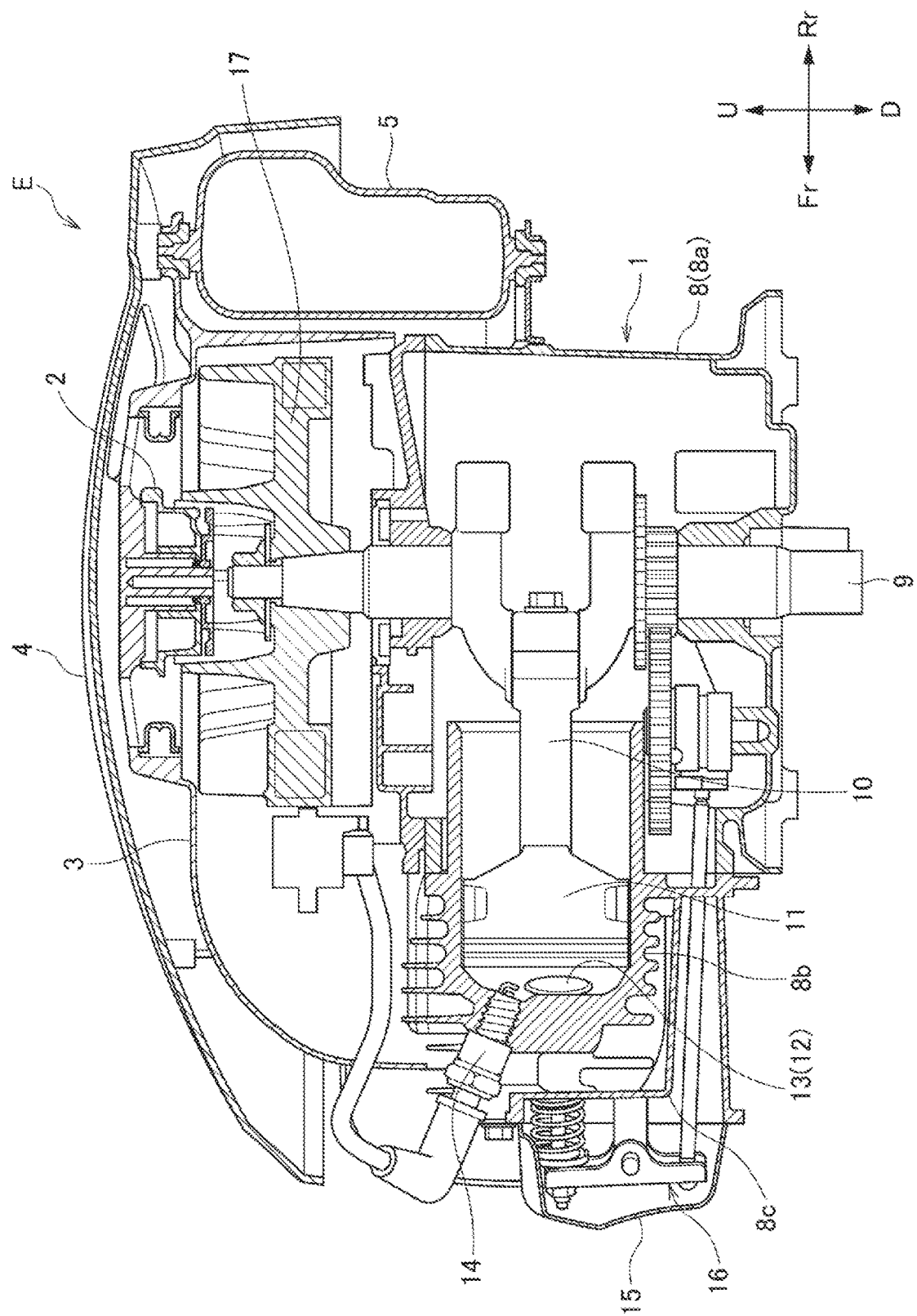
FIG. 1 is a cross-sectional view of an engine according to an embodiment of the invention.

An embodiment of the invention will be described below with reference to FIGS. 1 to 5. An engine E of the embodiment is a small general-purpose engine mounted on a walk-type lawnmower or the like and includes an OHV vertical engine as an engine body 1. In order to simplify and clarify the explanation in this specification and the like, an axial direction of a crankshaft 9 is defined as an up-down direction and a direction which is orthogonal to the up-down direction and in which a piston 11 reciprocally slides is defined as a front-back direction, and a direction orthogonal to the up-down direction and the front-back direction is defined as a left-right direction. In the drawing, the front of the engine E is shown as Fr, the rear as Rr, the left as L, the right as R, the upper as U, and the lower as D.

Engine

Figure 2:
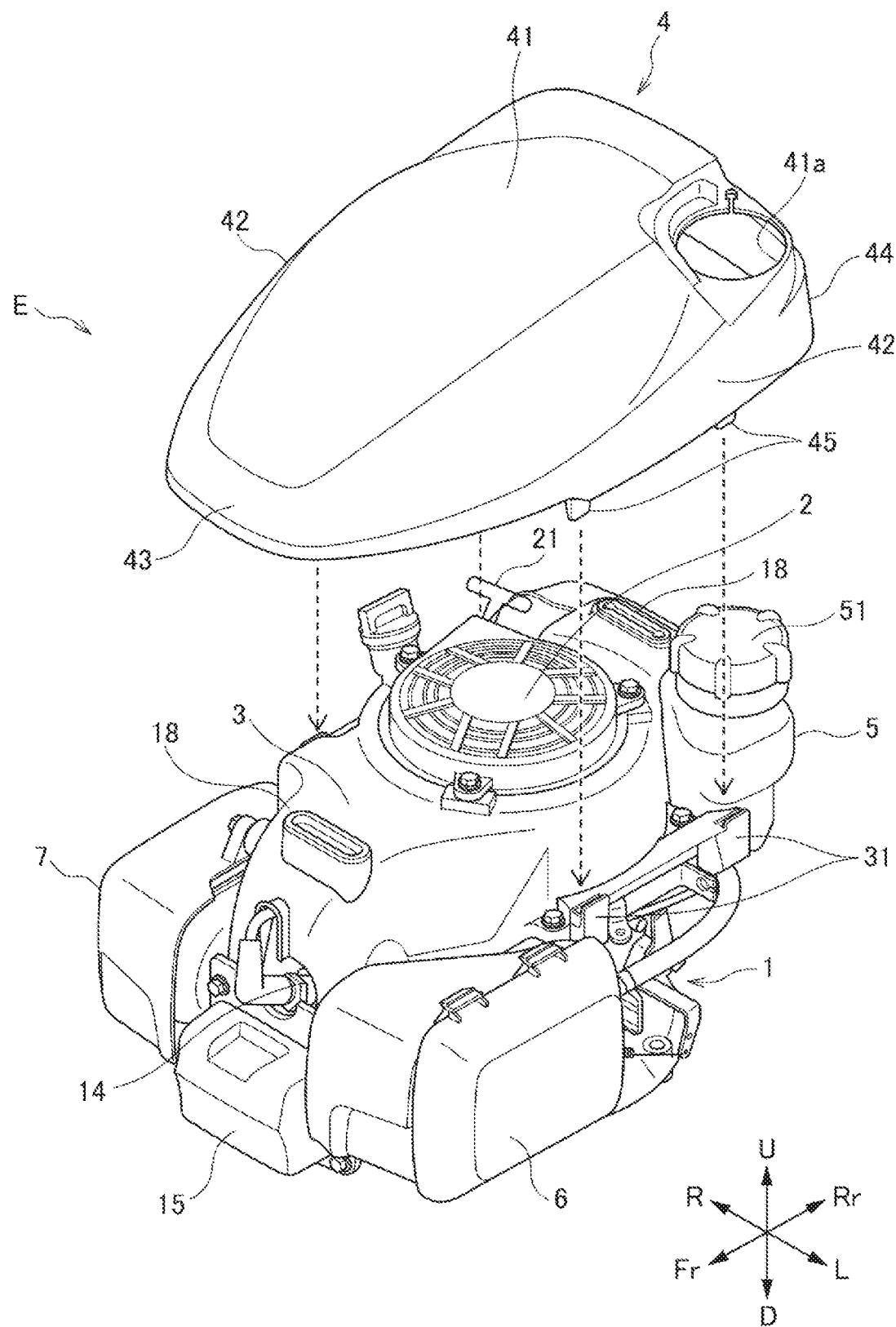
FIG. 2 is a perspective view of the engine with a top cover removed, as viewed from diagonally above and front.
Figure 3:
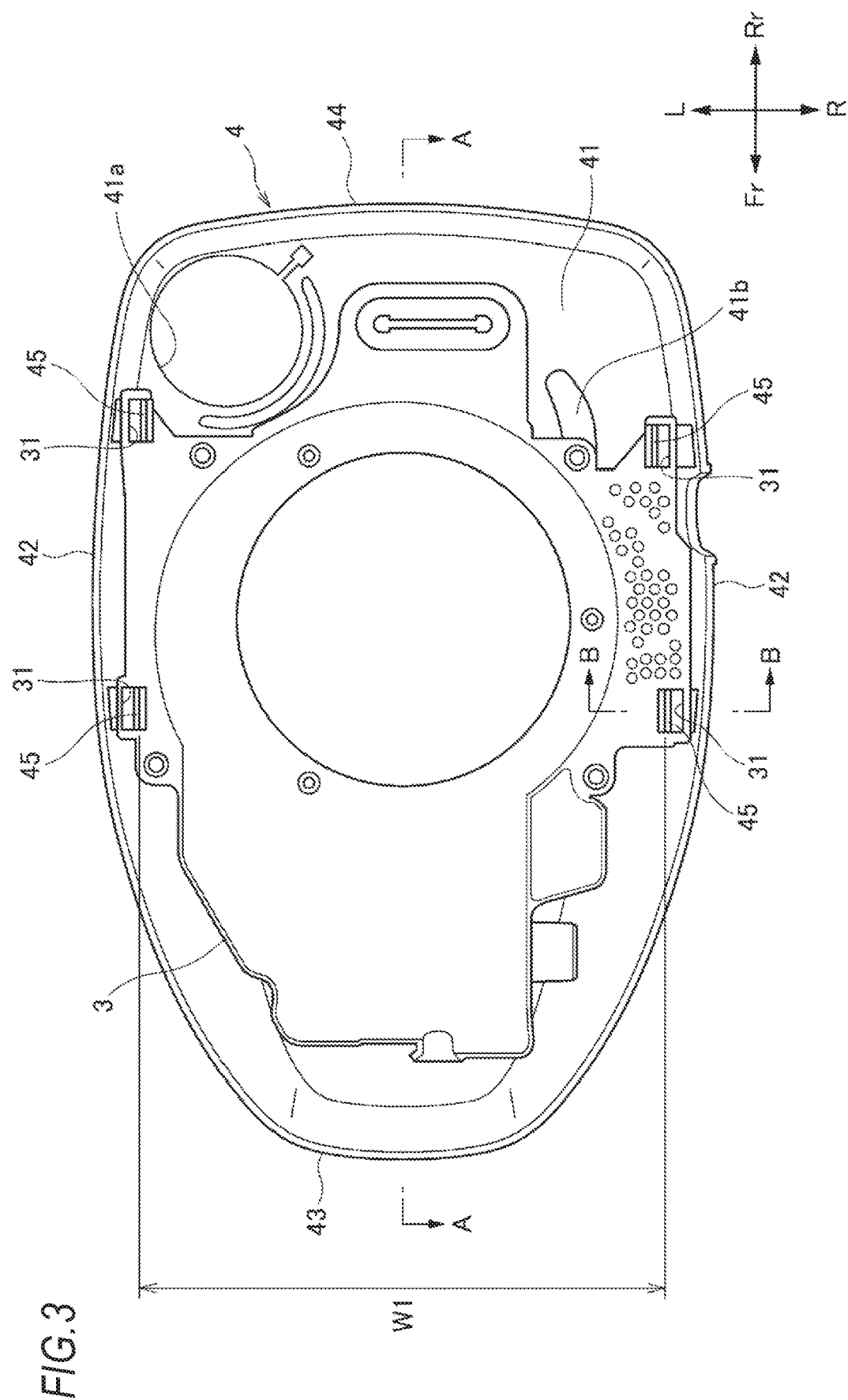
FIG. 3 is a bottom view of a top cover and a recoil cover.
Figure 4:
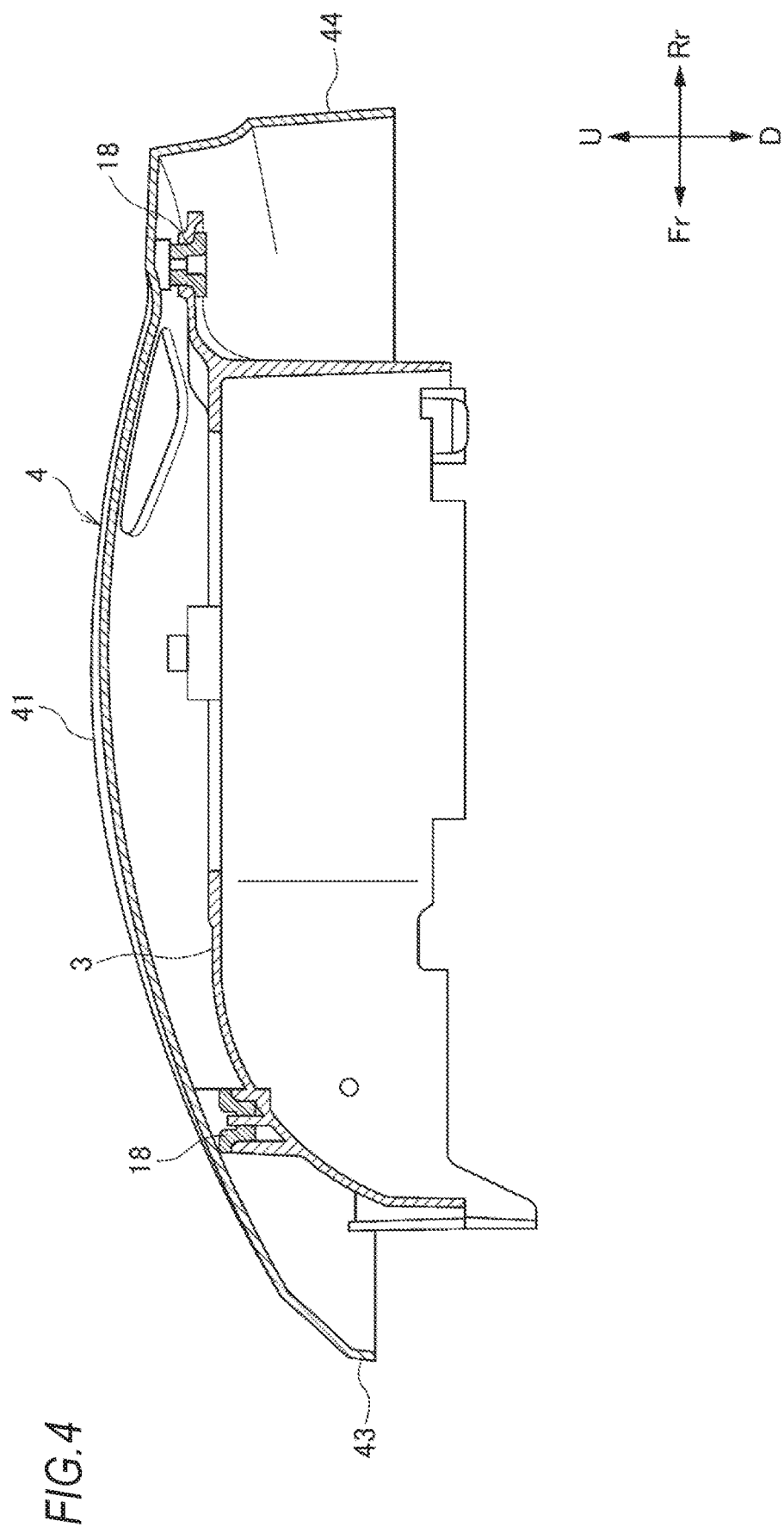
FIG. 4 is a cross-sectional view taken along the line A-A of FIG. 3.
Figure 5:
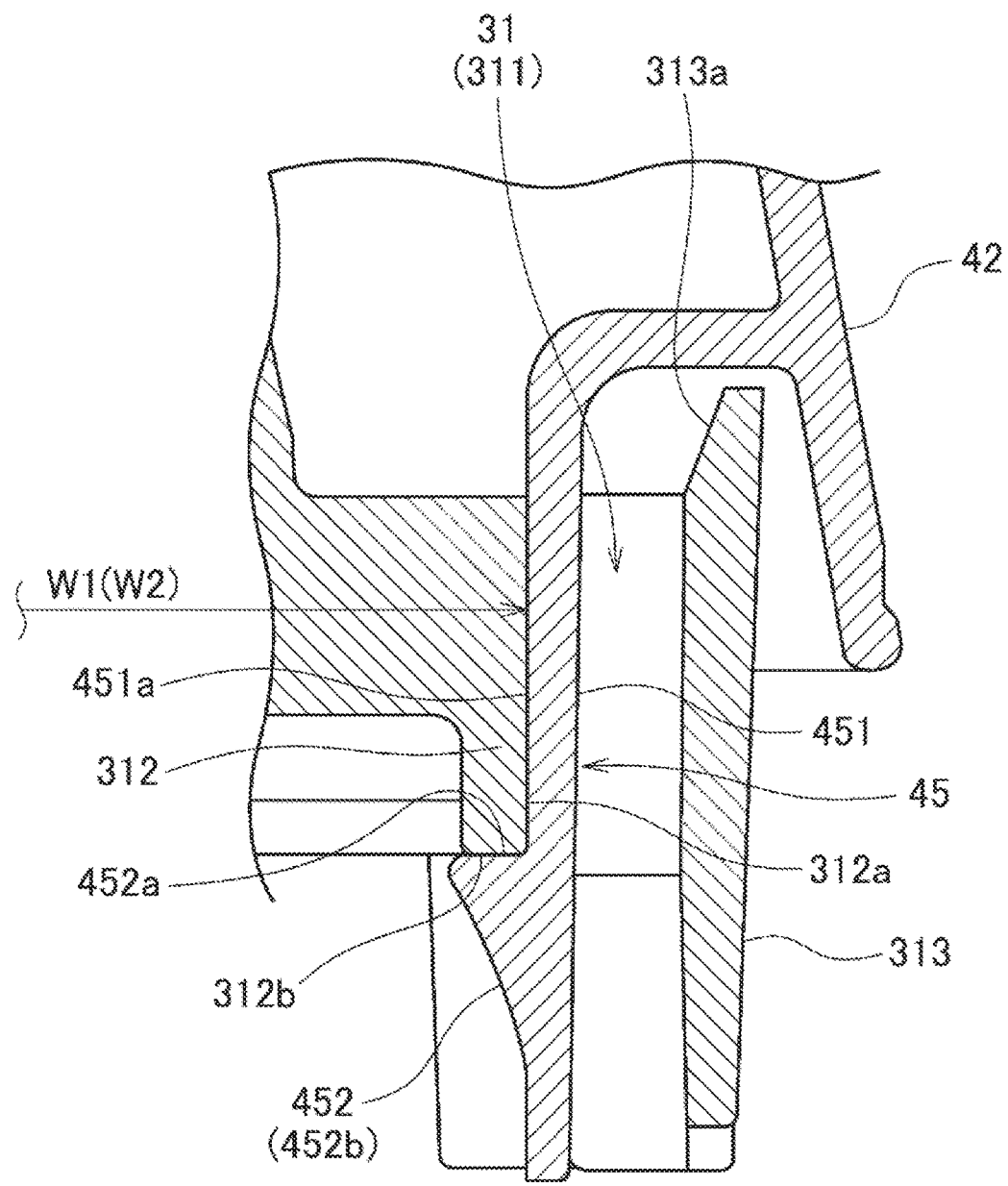
FIG. 5 is a cross-sectional view taken along the line B-B of FIG. 3.

As illustrated in FIGS. 1 and 2, the engine E of the embodiment includes an engine body 1, a recoil starter 2 arranged above the engine body 1 for starting the engine body 1, a recoil cover 3 which covers the recoil starter 2, a top cover 4 which covers the top of engine E, a fuel tank 5 for storing the fuel of the engine body 1, an air cleaner 6 which purifies the intake air of the engine body 1, and a muffler 7 which exhausts the exhaust gas of engine body 1 while muffling the gas.

Engine Body

As illustrated in FIG. 1, the engine body 1 includes an engine block 8 including a crankcase portion 8a and a cylinder portion 8b, the crankshaft 9 which is rotatably supported by the crankcase portion 8a in a state of being directed in the up-down direction, a piston 11 which is slidably fitted in the cylinder portion 8b and connected to the crankshaft 9 via a connecting rod 10, an intake valve 12, an exhaust valve 13, and a spark plug 14 which are provided on a head portion 8c of the cylinder portion 8b, a head cover 15 for covering the head portion 8c of the cylinder portion 8b, a valve mechanism 16 which operates the intake valve 12 and the exhaust valve 13 in accordance with the rotation of the crankshaft 9, and a flywheel 17 connected to the upper end of the crankshaft 9.

Top Cover

As illustrated in FIGS. 1 to 5, the top cover 4 is a resin component which is allowed to be elastically deformed to some extent and includes a top cover body 41 which covers the engine body 1 and the recoil starter 2 from above, a pair of side walls 42 extending downward from both left and right ends of the top cover body 41, a front wall 43 extending downward from the front end of the top cover body 41, and a rear wall 44 extending downward from the rear end of the top cover body 41. The top cover body 41 of the embodiment has a shape in which the central portion is curved upward, but may be flat. A hole 41a for exposing a fuel filler port 51 of the fuel tank 5 above the top cover 4 and a hole 41b for pulling out a handle 21 of the recoil starter 2 above the top cover 4 are formed at the rear end of the top cover body 41 of the embodiment, but the presence of the holes 41a and 41b can be changed as appropriate.

The top cover 4 is detachably attached to the engine body 1 side in an engaged state. Hereinafter, a mounting structure of the top cover 4 will be described with reference to FIGS. 3 to 5.

Engaging Claw

At least a pair of engaging claws 45 are extended downward on the left and right side walls 42 of the top cover 4. The top cover 4 of the embodiment includes two pairs of engaging claws 45 arranged in the front-back direction, that is, a total of four engaging claws 45, but the engaging claws 45 may be one pair or three or more pairs.

Each engaging claw 45 includes a plate portion 451 extending downward, a bulging portion 452 provided at the tip of the plate portion 451 and bulging inward (direction toward the other engaging claw 45) from the plate portion 451.

The plate portion 451 has a plate thickness direction in the left-right direction and elastic deformation in the left-right direction is allowed. Inner side surfaces 451a of the plate portions 451 of the pair of engagement claws 45 face each other with a predetermined gap W1 therebetween. The bulging portion 452 includes a substantially horizontal upper surface 452a extending in the left-right direction and the front-back direction and an inclined surface 452b which inclines outward as it extends downward.

Engaging Hole Portion

The recoil cover 3 is provided with two pairs of engaging hole portions 31 which engage with the two pairs of engaging claws 45. Each engaging hole portion 31 includes an insertion hole 311 into which the engaging claw 45 is inserted from above along the up-down direction, an inner wall portion 312 defining an inner end of the insertion hole 311, and an outer wall portion 313 defining an outer end of the insertion hole 311.

In the inner wall portions 312 of the pair of engagement hole portions 31, a gap W2 in the left-right direction between the outer side surfaces 312a thereof is substantially equal to the gap W1 described above. The wall portion 312 includes a bottom surface 312b which engages with the bulging portion 452 (upper surface 452a) of the engaging claw 45. An inclined surface 313a which inclines inward while going downward is provided at the upper end of the outer wall portion 313.

Elastic Member

An elastic member 18 is provided between the recoil cover 3 and the top cover 4. The elastic member 18 may be provided on the recoil cover 3 side or the top cover 4 side. Then, the elastic member 18 is compressed between the recoil cover 3 and the top cover 4 when the top cover 4 is attached.

Top Cover Attachment

When the top cover 4 configured as above is attached to the engine body 1 side, the two pairs of engaging claws 45 provided on the top cover 4 are inserted into the two pairs of the engaging hole portions 31 (insertion holes 311) provided on the recoil cover 3 from above. Here, the tip of the engaging claw 45 is guided to the insertion hole 311 along the inclined surface 313a formed at the upper end of the outer wall portion 313 of the engaging hole portion 31. Therefore, not only can the top cover 4 be easily attached, but the engagement claw 45 can also be prevented from being damaged by riding on the outside of the outer wall portion 313 of the engaging hole portion 31.

When the two pairs of engaging claw 45 are inserted into the two pairs of engaging hole portions 31 (insertion holes 311) from above, the inclined surface 452b formed in the bulging portion 452 of the engaging claw 45 abuts on the upper end of the inner wall portion 312 of the engaging hole portion 31. When the top cover 4 is pushed downward here, the bulging portions 452 of the two pairs of engaging claws 45 enter the insertion holes 311 while being elastically deformed so that the plate portions 451 of the two pairs of engaging claws 45 are guided by the inclined surfaces 452b to open outward. When the top cover 4 is pushed downward and the bulging portion 452 of the engaging claw 45 gets over the inner wall portion 312 of the engaging hole portion 31, the bulging portions 452 of the two pairs of engaging claws 45 are displaced inward by the elastic restoring force of the plate portions 451 and the upper surface 452a of the bulging portion 452 engages with the bottom surface 312b of the inner wall portion 312 of the engaging hole portion 31 from below. As a result, the top cover 4 is restricted from moving upward and is attached to the engine body 1 side in the engaged state.

In the top cover 4 attached as such, even when an external force such as an object hitting the side wall 42 is applied, the external force acts in a direction in which the engaging claw 45 engages with the inner wall portion 312 of the engaging hole portion 31, that is, in a direction in which the engaging claw 45 moves inward. As a result, the top cover 4 can be prevented from coming off. The elastic member 18 is provided between the recoil cover 3 and the top cover 4. Thus, with the top cover 4 attached, the elastic member 18 is compressed between the recoil cover 3 and the top cover 4, so that the vibration of the top cover 4 can be reduced.

Removing Top Cover

When removing the top cover 4, the engagement between the engaging claw 45 and the engaging hole portion 31 is released and the top cover 4 is lifted upward. In the embodiment, since the two pairs of engaging claws 45 are provided only on the side walls 42 on the left and right sides of the top cover 4, by simply elastically deforming both side walls 42 of the top cover 4 to expand in the left-right direction, the engagement between the bulging portion 452 of the engaging claw 45 and the inner wall portion 312 of the engaging hole portion 31 can be released. Then, by lifting the top cover 4, the top cover 4 can be easily removed.

On the other hand, when the top cover 4 is lifted to widen the front wall 43 and the rear wall 44 that intersect with both side walls 42 of the top cover 4, an external force acts so that both side walls 42 of the top cover 4 approach the inside. Here, the external force acts in a direction in which the engaging claw 45 engages with the inner wall portion 312, that is, in a direction in which the engaging claw 45 moves inward, so that the top cover 4 cannot be removed. Therefore, it is possible to prevent the top cover 4 from coming off due to an erroneous operation.

The embodiment described above can be appropriately modified, improved, and the like.

For example, the engaging hole portion 31 of the embodiment described above is provided on the recoil cover 3 attached to the engine body 1. However, the engaging hole portion 31 may be provided directly on the engine body 1 or may be provided on a component other than the recoil cover 3 attached to the engine body 1.

An another embodiment of the invention will be described below with reference to FIGS. 6 to 10. An engine E of the embodiment is a small general-purpose engine mounted on a walk-type lawnmower or the like and includes an OHV vertical engine as an engine body 101. In order to simplify and clarify the explanation in this specification and the like, an axial direction of a crankshaft 111 is defined as an up-down direction and a direction which is orthogonal to the up-down direction and in which a piston 113 reciprocates is defined as a front-back direction, and a direction orthogonal to the up-down direction and the front-back direction is defined as a left-right direction. In the drawing, the front of the engine E is shown as Fr, the rear as Rr, the left as L, the right as R, the upper as U, and the lower as D.

Engine

Figure 6:
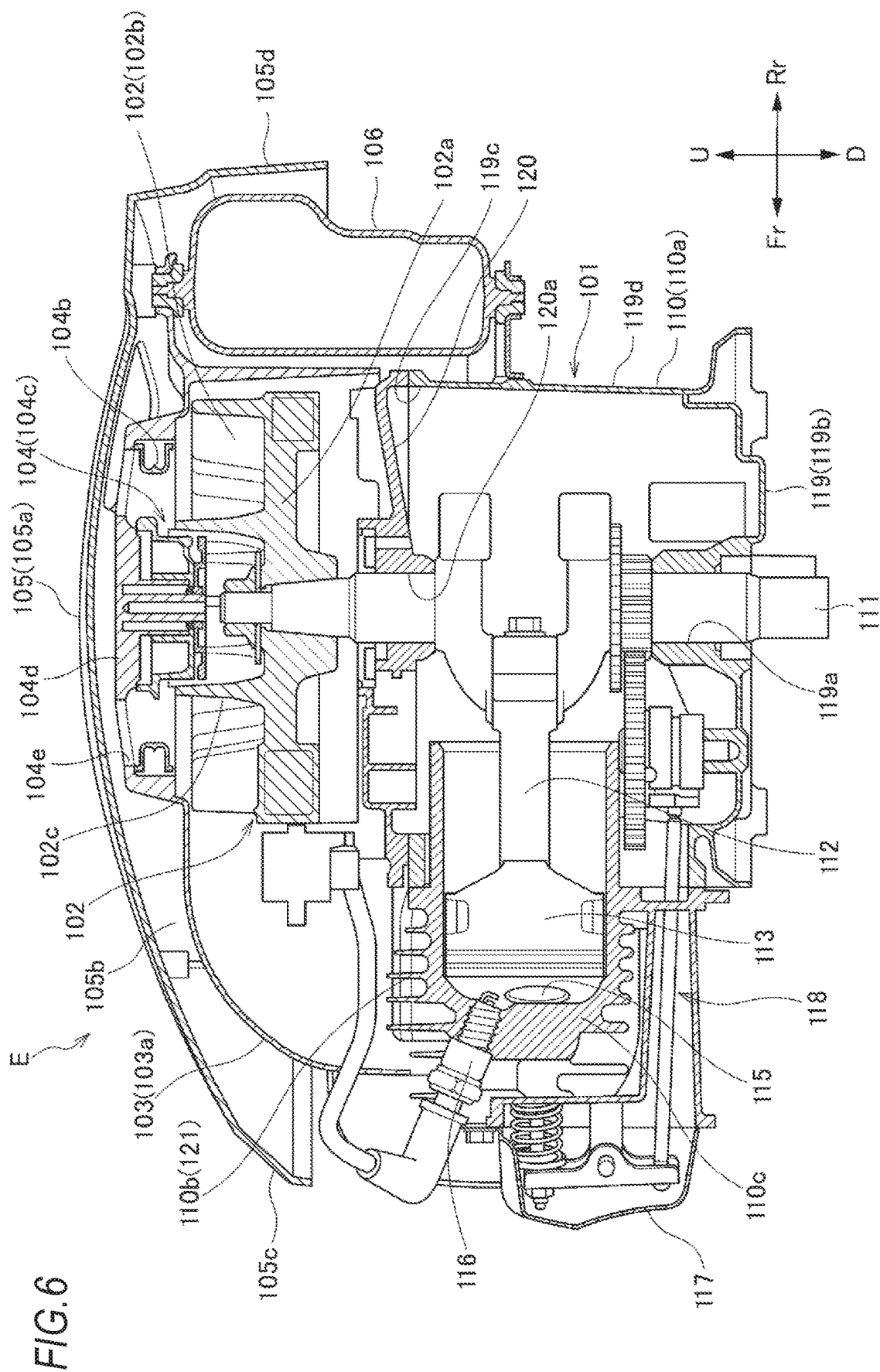
FIG. 6 is a cross-sectional view of an engine according to another embodiment of the invention.
Figure 7:
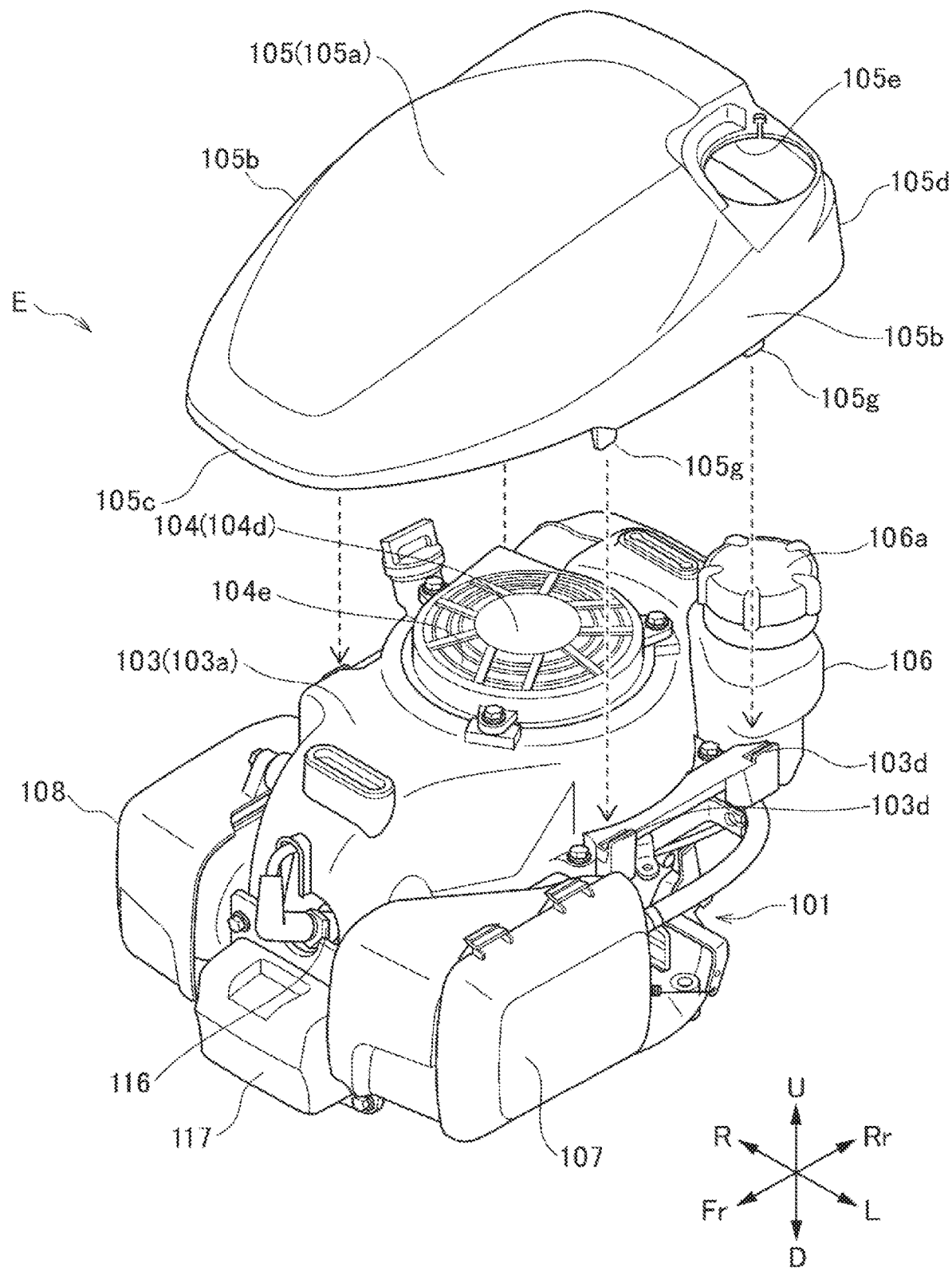
FIG. 7 is a perspective view of the engine shown in FIG. 6 with a top cover removed, as viewed from diagonally above and front.
Figure 8:
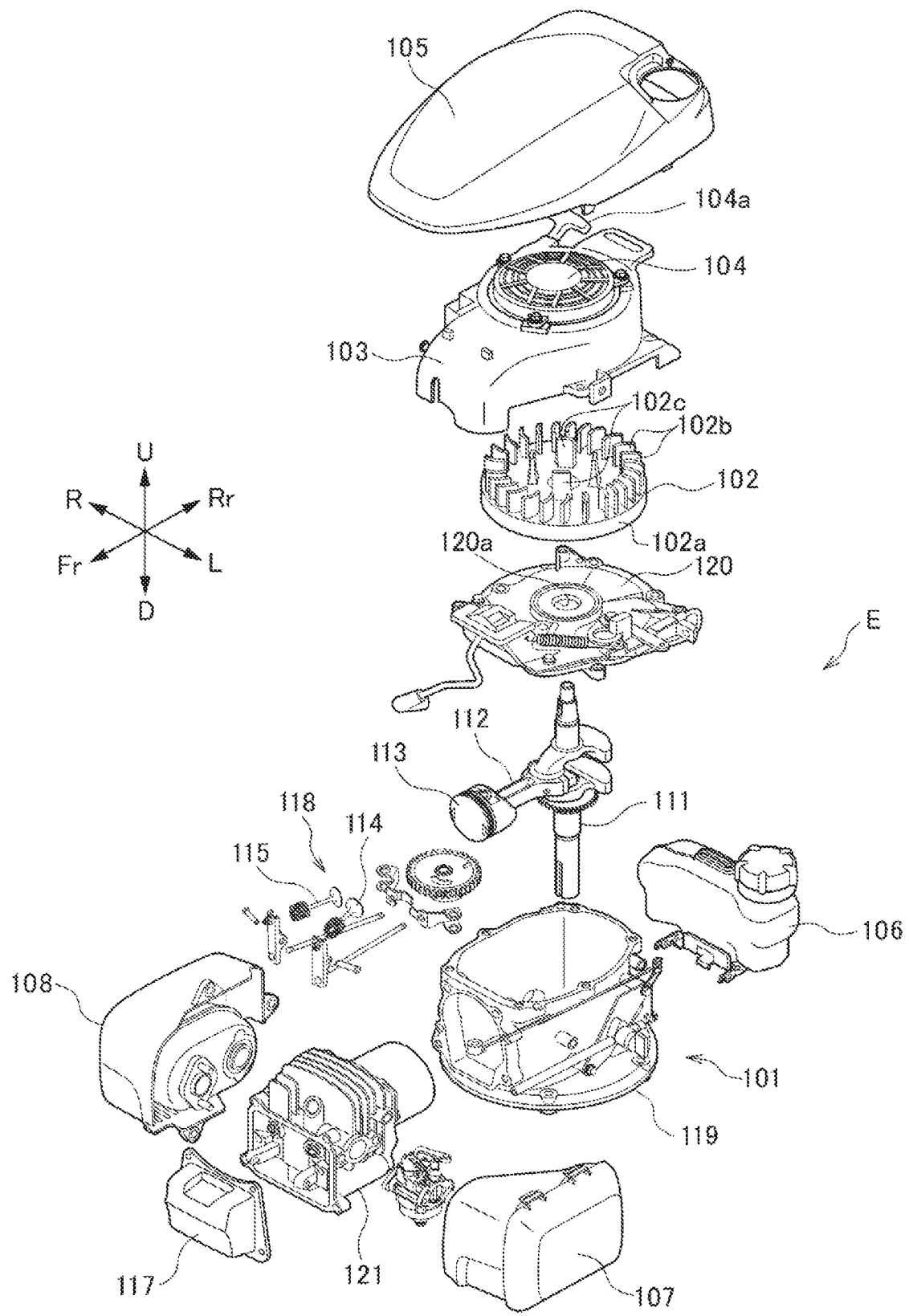
FIG. 8 is an exploded perspective view of the engine shown in FIG. 6 as viewed from diagonally above and front.

As illustrated in FIGS. 6 to 8, the engine E of the embodiment includes the engine body 101, a cooling fan 102 arranged above the engine body 101, a fan cover 103 for accommodating the fan 102, a recoil starter 104 which is placed above the fan 102 and starts the engine body 101, a top cover 105 which covers at least the upper part of the engine body 101, the fan 102, the fan cover 103, and the recoil starter 104, a fuel tank 106 for storing the fuel of the engine body 101, an air cleaner 107 which purifies the intake air of the engine body 101, and a muffler 108 which exhausts the exhaust gas of the engine body 101 while muffling the gas.

Engine Body

As illustrated in FIGS. 6 and 8, the engine body 101 includes an engine block 110 including a crankcase portion 110a and a cylinder portion 110b, the crankshaft 111 rotatably supported by the crankcase portion 110a to be oriented in the up-down direction, the piston 113 slidably fitted in the cylinder portion 110b and connected to the crankshaft 111 via a connecting rod 112, an intake valve 114, an exhaust valve 115, and a spark plug 116 provided in a head portion 110c of the cylinder portion 110b, a head cover 117 which covers a head portion 110c of the cylinder portion 110b, and a valve mechanism 118 which operates the intake valve 114 and the exhaust valve 115 according to the rotation of the crankshaft 111.

The engine block 110 of the embodiment has a three-part structure consisting of: a crankcase body 19 including a bottom portion 119b that includes a first crankshaft insertion hole 119a, and a tubular portion 119d including a case opening portion 119c at an upper end; a crankcase cover 120 including a second crankshaft insertion hole 120a and covering the case opening portion 119c of the crankcase body 119; and a cylinder unit 121 extending forward from the tubular portion 119d of the crankcase body 119. The crankcase body 119 and the crankcase cover 120 form the crankcase portion 110a and the cylinder unit 121 forms the cylinder portion 110b. However, the configuration of the engine block 110 is not limited to that of the embodiment and can be changed as appropriate.

Fan

The fan 102 of the embodiment is integrally formed with a flywheel which applies a moment of inertia to the crankshaft 111. Specifically, the fan 102 of the embodiment includes a disc-shaped base 102a which is connected to the upper end of the crankshaft 111 and functions as a flywheel, a large number of fins 102b extending upward from a peripheral edge of the upper surface of the base 102a and forming a centrifugal fan, and a recoil connection portion 102c extending upward from the central portion of the upper surface of the base 102a and connected to the recoil starter 104.

When the fan 102 rotates as the engine is driven, the fan 102 generates an inertia moment, and transmits the inertia moment to the crankshaft 111, thereby smoothing the engine rotation. When the fan 102 rotates, a large number of fins 102b push out air in an outer diameter direction, so that the central side of the fan 102 becomes a negative pressure state, and thus air is taken into the central side of the fan 102 from above the fan 102. In other words, the rotating fan 102 takes in air from the upper side to the central side of the fan 102, pushes out the taken-in air in the outer diameter direction, and supplies it as engine cooling air to the engine body 101.

Fan Cover

The fan cover 103 is attached to the engine body 101 side and includes a cylindrical fan cover body 103a which covers at least the outer diameter side of the fan 102, an upper opening 103b which serves as an air intake port, and a lower opening 103c which serves as an air discharge port. When the fan 102 rotates, air is taken into the central side of the fan 102 from above through the upper opening 103b and the taken-in air is pushed out in the outer diameter direction. The air pushed out in the outer diameter direction is guided downward on an inner peripheral surface of the fan cover body 103a and supplied to the engine body 101 as engine cooling air.

Recoil Starter

The recoil starter 104 includes a handle 104a attached to the tip of the rope, a reel 104b around which the rope is wound, a spring (not illustrated) for urging the reel 104b in a direction of winding the rope, a fan connecting portion 104c for connecting the recoil connecting portion 102c of the fan 102 and the reel 104b via a one-way clutch (not illustrated), and a recoil cover 104d covering the top of recoil starter 104.

When the handle 104a is pulled in a state where the engine body 101 is stopped, the reel 104b rotates in one direction and the rotation is transmitted to the fan 102 via the fan connecting portion 104c. When the fan 102 rotates, the engine body 101 starts as the crankshaft 111 rotates. When the engine body 101 starts, the transmission of the rotation from the fan 102 to the reel 104b is cut off by the one-way clutch. When the engine body 101 starts, the reel 104b is rotated in the other direction by the urging force of the spring and the rope is wound around the reel 104h.

The recoil starter 104 is attached to the fan cover 103 to cover the upper opening 103b which is the air intake port of the fan cover 103. However, since the recoil cover 104d which covers the top of the recoil starter 104 includes an opening portion 104e which serves as an air intake port and includes many gaps inside the recoil starter 104, the air intake by the fan 102 via the upper opening 103b is allowed.

Top Cover

The top cover 105 includes a top cover body 105a for covering the engine body 101, the fan 102, the fan cover 103, and the recoil starter 104 from above, a pair of side walls 105b extending downward from the left and right ends of the top cover body 105a, a front wall 105c extending downward from the front end of the top cover body 105a, and a rear wall 105d extending downward from the rear end of the top cover body 105a.

The top cover body 105a of the embodiment has a shape in which the central portion bulges upward, but the top cover body 105a may have a flat shape. A hole 105e for exposing a fuel filler port 106a of the fuel tank 106 above the top cover 105 and a hole 105f for pulling out the handle 104a of the recoil starter 104 above the top cover 105 are formed at the rear end of the top cover body 105a of the embodiment. However, the presence of the holes 105e and 105f can be changed as appropriate.

The top cover 105 of the embodiment includes at least a pair of engaging claws 105g extending downward from the left and right side walls 105b. By engaging the engaging claw 105g with an engaging hole portion 103d provided on the fan cover 103, the top cover 105 is detachably attached to the engine body 101 side in an engaged state. However, the attachment structure of the top cover 105 is not limited to that of the embodiment and can be changed as appropriate.

Air Introduction Path

Figure 9:
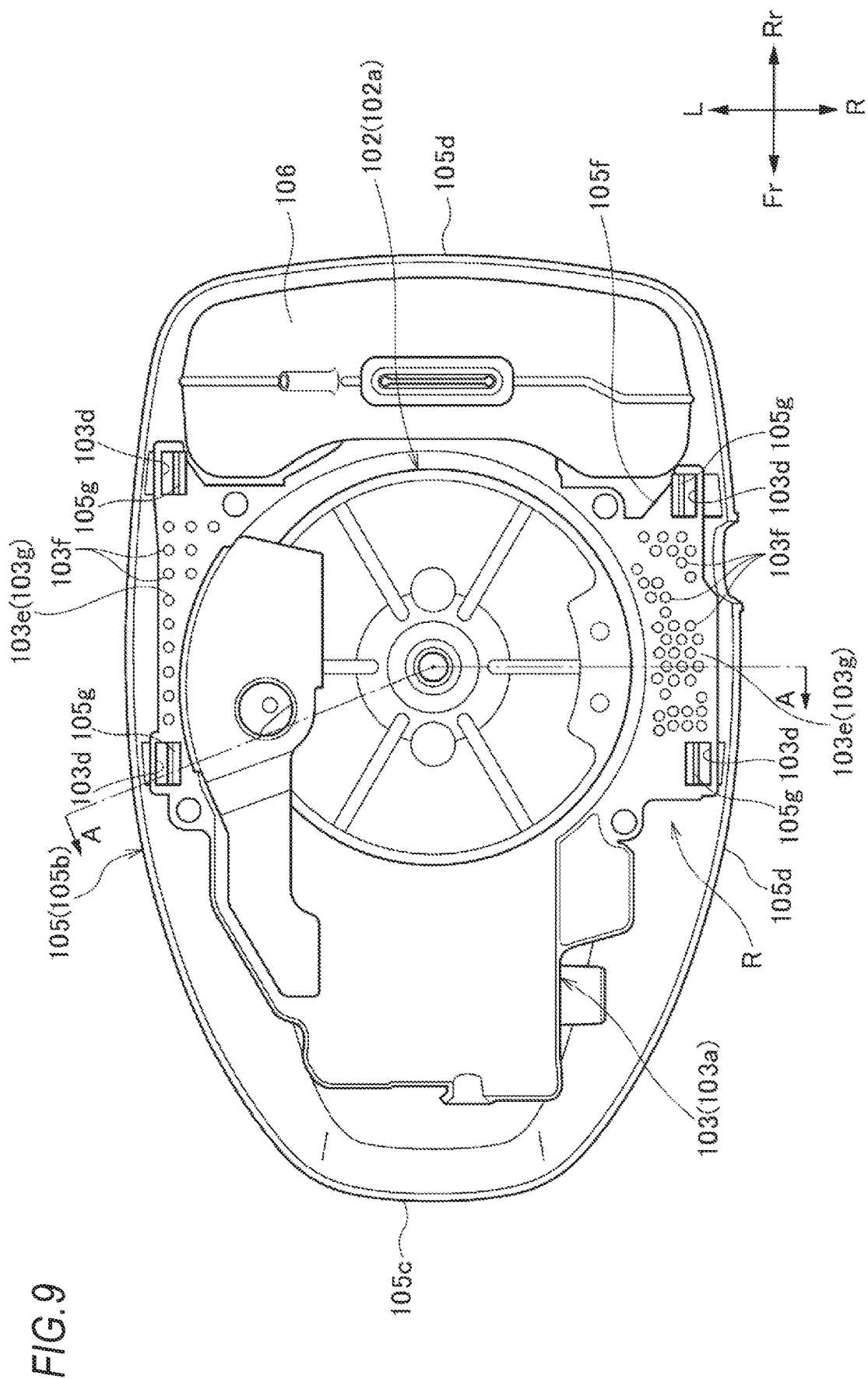
FIG. 9 is a view of upper components of the engine shown in FIG. 6 as viewed from below.
Figure 10:
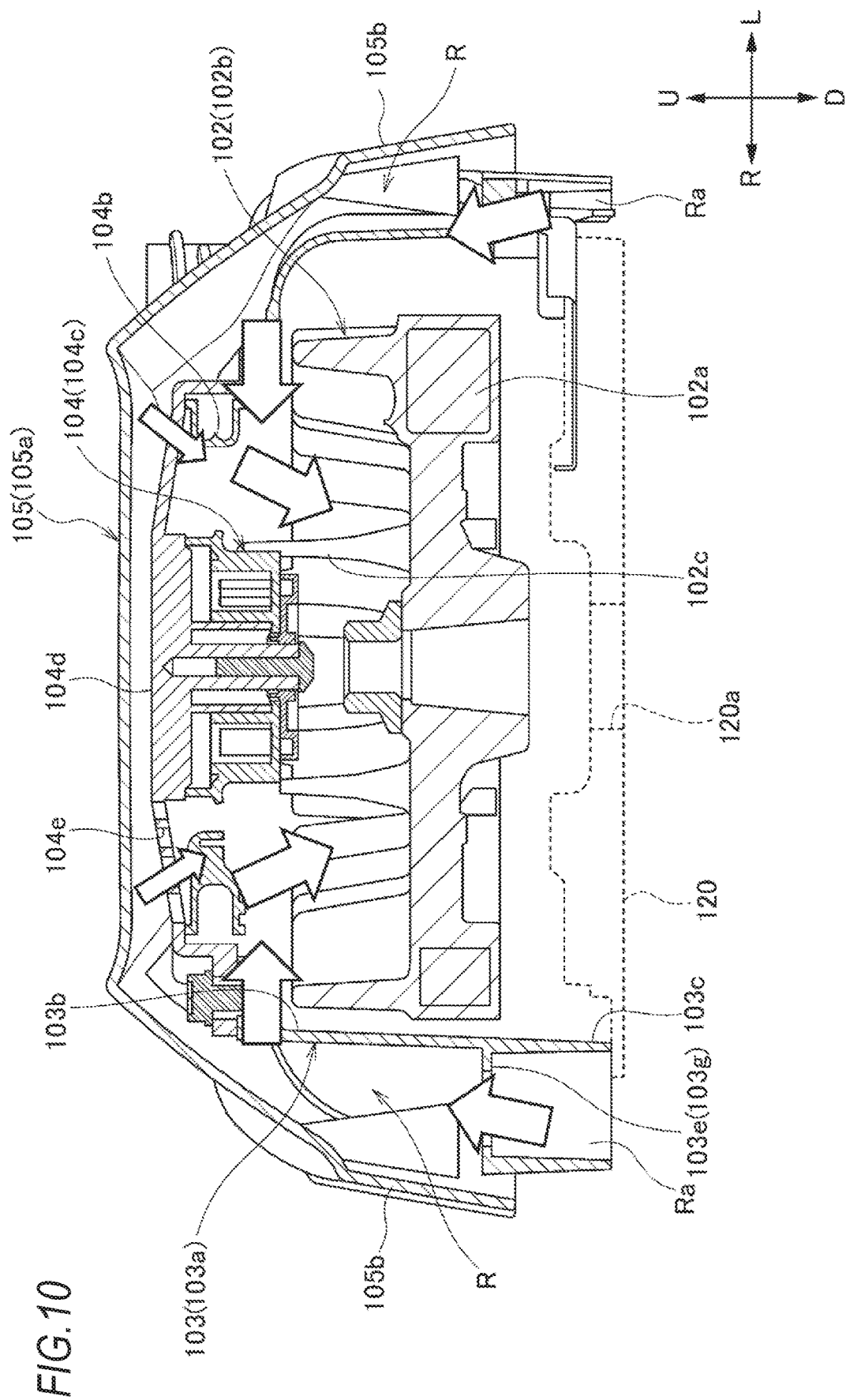
FIG. 10 is a cross-sectional view taken along the line A-A of FIG. 9.

As illustrated in FIGS. 9 and 10, an air introduction path R for introducing air from the outside by the fan 102 is formed between the top cover 105 and the fan 102. More specifically, the air introduction path R is a space formed between the inner surface of the top cover 105 and the outer surface of the fan cover 103 and a space between the lower end of the top cover 105 and the lower end of the fan cover 103 is set as an air inlet Ra. The air introduced from the inlet Ra is guided upward along the inner surface of the top cover 105 and the outer surface of the fan cover 103 and the air is taken into the inside of the fan cover 103 from the upper opening 103b of the fan cover 103 through the opening portion 104e of the recoil cover 104d.

According to such an engine E, air is taken into the fan 102 from below the top cover 105 via the air introduction path R formed between the top cover 105 and the fan cover 103. Therefore, it is not necessary to provide an air introduction hole in the top cover 105. As a result, the rigidity of the top cover 105 can be improved and the design appearance of the engine can be improved.

Filter

The air introduction path R is provided with a filter 103e which prevents entry of foreign matter. More specifically, the filter 103e of the embodiment is arranged in the air introduction path R and is configured by a plate member 103g which prevents the entry of foreign matter while introducing air through a plurality of hole portions 103f. According to such a filter 103e, entry of foreign matter can be regulated by the air introduction path R. Since the filter 103e is composed of a plurality of hole portions 103f provided in the plate member 103g, it is possible to effectively prevent the intrusion of foreign matter by appropriately adjusting the shape and the number of the hole portions 103f.

The filter 103e of the embodiment is formed integrally with the fan cover 103. Here, the filter 103e is integrally provided on the fan cover 103, so that the number of parts can be reduced and the manufacturing cost can be reduced.

The embodiment described above can be appropriately modified, improved, and the like. For example, in the embodiment described above, the space on the left and right of the fan cover 103 is used as the main inlet Ra of the air and the filter 103e is provided only in that portion, but the position and number of the filter 103e can be changed as appropriate.

The embodiment described above can be appropriately modified, improved, and the like. For example, in the embodiment described above, the space on the left and right of the fan cover 103 is used as the main inlet Ra of the air and the filter 103e is provided only in that portion, but the position and number of the filter 103e can be changed as appropriate.

It is understood that one or more of the aforementioned embodiments of the invention may be combined as long as the combined embodiments are not mutually exclusive.

Summary

At least the following matters are described in the present specification. Although the constituent elements and the like corresponding to those of the embodiment described above are shown in parentheses, the invention is not limited thereto.

(1) An engine (engine E) which includes:
an engine body (engine body 1); and
a top cover (top cover 4) covering the engine body, where
the top cover is provided with at least a pair of engaging claws (engaging claws 45) extending downward on side walls (side wall 42) on both sides,
the engine body is provided with a pair of engaging hole portions (engaging hole portions 31) with which the pair of engaging claws are engaged,
each engaging claw includes,
a plate portion (plate portion 451) extending downward, and
a bulging portion (bulging portion 452) which is provided at a tip of the plate portion and bulges inward from the plate portion, and
the bulging portion engages with a bottom surface (bottom surface 312b) of an inner wall portion (inner wall portion 312) of the engaging hole portion.

According to (1), in the engaging claw of the top cover, the bulging portion which bulges inward from the plate portion engages with the bottom surface of the inner wall portion of the engaging hole portion. Accordingly, even when an external force such as an object hitting the side wall of the top cover is applied, the external force acts in the direction in which the engaging claw engages with the inner wall portion, and thus the top cover can be prevented from coming off.

(2) The engine according to (1), where
the at least one pair of engaging claws are provided only on the side walls on both sides of the top cover.

According to (2), since the engaging claws are provided only on the side walls on both sides of the top cover, when the engine body needs maintenance, the top cover can be easily removed by lifting the top cover so that both side walls of the top cover are spread. On the other hand, when the top cover is lifted to spread the front wall and the rear wall that intersect with both side walls of the top cover, an external force which makes the both side walls of the top cover approach inward is applied. Here, the external force acts in the direction in which the engaging claw engages with the inner wall portion, so that the top cover can be prevented from coming off. Therefore, it is possible to prevent the top cover from coming off due to an erroneous operation.

(3) The engine according to (1) or (2), where
an outer wall portion (outer wall portion 313) of the engaging hole portion is provided with an inclined surface (inclined surface 313a) which inclines inward while going downward.

According to (3), the outer wall portion of the engaging hole portion is provided with the inclined surface which inclines inward while going downward. Therefore, when attaching the top cover to the engine body side, the tip surface of the engaging claw is guided to the engaging hole portion along the inclined surface. It is easy to attach the top cover. When mounting on the engine body side, the engaging claw can be prevented from being damaged by riding on the outside of the outer wall portion of the engaging hole portion.

(4) The engine according to any one of (1) to (3), where
the pair of engaging hole portions are provided on a recoil cover (recoil cover 3), and
an elastic member (elastic member 18) is provided between the recoil cover and the top cover.

According to (4), since the elastic member is provided between the recoil cover and the top cover, vibration can be reduced by crushing the elastic member when attaching the top cover.

(5) An engine (engine E) which includes:

an engine body (engine body 101);

a fan (fan 102) placed above the engine body; and a top cover (top cover 105) covering the engine body and the fan, where an air introduction path (air introduction path R) is provided between the top cover and the fan, and air is taken into the fan from below the top cover via the air introduction path.

According to (5), the air is taken into the fan from below the top cover via the air introduction path provided between the top cover and the fan. Therefore, it is not necessary to provide an air introduction hole in the top cover, and thus the rigidity of the top cover can be improved and the design appearance of the engine can be improved.

(6) The engine according to (5), where a filter (filter 103*e*) is provided in the air introduction path.

According to (6), foreign matter can be prevented from entering the fan by providing the filter in the air introduction path provided between the top cover and the fan from below the top cover.

(7) The engine according to (6), where the engine body is covered with a fan cover (fan cover 103) which accommodates the fan, the air introduction path is provided between the top cover and the fan cover, and the filter is provided on the fan cover.

According to (7), the number of parts can be reduced and the manufacturing cost can be reduced by providing the filter on the fan cover.

(8) The engine according to (7), where the filter is composed of a plurality of hole portions (hole portions 103*f*) provided in a plate member (plate member 103*g*).

According to (8), since the filter is composed of a plurality of hole portions provided in the plate member, it is possible to effectively prevent the entry of foreign matter by appropriately adjusting the shape and number of the hole portions.

(9) The engine according to (7) or (8), where the fan is integrally formed with a flywheel (base 102*a*) connected to an upper end of a crankshaft (crankshaft 111).

According to (9), since the fan is integrally formed with the flywheel, the manufacturing cost can be reduced and the engine can be downsized.

What is claimed is:

1. An engine comprising:

an engine body; and a top cover covering the engine body, wherein the top cover is provided with at least a pair of engaging claws extending downward on side walls on both sides, the engine body is provided with a pair of engaging hole portions with which the pair of engaging claws are engaged, each engaging claw includes, a plate portion extending downward, and a bulging portion which is provided at a tip of the plate portion and bulges inward from the plate portion, the bulging portion engages with a bottom surface of an inner wall portion of the engaging hole portion, the at least one pair of engaging claws are provided only on the side walls on both sides of the top cover, and walls provided to the top cover, except for the side walls, are not provided with any engaging claws.

2. The engine according to claim 1, wherein an outer wall portion of the engaging hole portion is provided with an inclined surface which inclines inward while going downward.

3. The engine according to claim 1, wherein the pair of engaging hole portions are provided on a recoil cover, and an elastic member is provided between the recoil cover and the top cover.

* * * * *